UNITED STATES PATENT OFFICE.

LEWSON E. CHASE, OF CHARLESTOWN, ASSIGNOR TO CHASE & CO., OF BOSTON, MASSACHUSETTS.

IMPROVEMENT IN THE MANUFACTURE OF CONFECTIONERY.

Specification forming part of Letters Patent No. 54,296, dated May 1, 1866.

*To all whom it may concern:*

Be it known that I, LEWSON E. CHASE, of Charlestown, in the county of Middlesex and State of Massachusetts, have made a new and useful Improvement having reference to Confectionery; and I do hereby declare the nature thereof to be fully and clearly set forth in the following specification.

The object of my invention is twofold: first, to supply a demand that has long existed for a certain class of confectionery—viz., a lozenge or confectioner's pipe which, while it retained all the flavor and nutritive qualities of the ordinary or hard lozenge, shall be more readily soluble, and at the same time maintain its normal or soluble character when exposed to the action of heat or atmospheric influence; second, to prevent that dryness and induration of other kinds of confectionery which results from the evaporation of the more volatile parts thereof.

It is a fact well known that some kinds of confectionery, especially those of which sugar and gum-arabic are the principal ingredients, such as lozenges and confectioner's pipe, are hard and slow to be dissolved on account of the large percentage of gum used in their manufacture.

To supply the above-mentioned demand, or, in other words, to produce a lozenge or pipe which, while it retained all the rich flavor and nutritive qualities of the ordinary or hard lozenge or pipe, should at the same time be free of its excessive hardness, has long been the desideratum of confectioners, and numerous experiments have been made and great amounts of time and money have been expended in fruitless efforts to attain the result effected by my invention or improvement.

The nature of my invention consists in the employment or use of glycerine in combination with the sugar and gum or the ingredients of which confectionery is usually made.

My invention has reference not only to what is termed "dry" confectionery, such as lozenges, confectioner's pipe, &c., but is equally applicable to most, if not all, kinds of what is known in commerce as "boiled" confectionery, such as sweet chocolate, gum-drops, confectioner's paste, &c.

In carrying out my invention, or making what I term the "creamellow" or "soft" lozenge or pipe, I take the ingredients such as are usually employed in making the ordinary lozenge or pipe, &c., and the same proportions of such ingredients. To one hundred pounds of the gum and sugar properly prepared and combined with the essential oil used to flavor the same I add five pounds (avoirdupois) of pure glycerine and thoroughly incorporate the whole together. The process of making or manufacturing my said lozenge or pipe in other respects is like that commonly employed in manufacturing the hard lozenge or pipe.

I would remark that the amount or proportion of the glycerine to be used depends upon the consistency which it is desired that the lozenge or article should have. I do not, therefore, limit my invention to the precise amount above given, as the same may be somewhat varied without changing the nature of my invention.

In manufacturing what is termed "boiled" confectionery, such as sweet chocolate, gum goods, confectioner's paste, and various other articles of like nature, to one hundred pounds of the other constituents ordinarily used in making the same I combine two pounds (avoirdupois) of glycerine, and thoroughly mix the several ingredients together. The whole is then to be manipulated in the usual manner.

I would also state, with regard to this latter class of confectionery, that a smaller percentage of the glycerine than that stated might be employed and still be productive of good results. Therefore I do not restrict my invention to the definite amount mentioned, as more or less may be employed in making the different varieties, according to the judgment of the confectioner.

The employment of glycerine in the manner as above set forth in the manufacture of confectionery is productive of several important results. In the first place, it remedies the excessive hardness incident to that class of dry confectionery in which gum-arabic and sugar are the principal elements; second, owing to its non-volatile character, it prevents the evaporation incident to most, if not all, kinds of what is termed "boiled" confectionery, and maintains them in their normal condition or consistency; third, it being an odorless as well as a tasteless liquid, it imparts no disagreea ble taste or smell to the goods or confectionery with which it is compounded; and, fourth, possessing a highly-nutritive nature, it of course renders the lozenge or article with which it is compounded still more nutritious.

Having thus described my invention, what I claim, and desire to secure by Letters Patent, is—

The use or employment of glycerine in the manufacture of confectionery, substantially as and for the purpose set forth.

LEWSON E. CHASE.

Witnesses:
H. F. CRISTY,
F. P. HALE, Jr.